(12) United States Patent
Vilkov et al.

(10) Patent No.: US 6,393,543 B1
(45) Date of Patent: May 21, 2002

(54) SYSTEM AND A METHOD FOR TRANSFORMATION OF MEMORY DEVICE ADDRESSES

(75) Inventors: Boris Nikolaevich Vilkov, St. Petersburg (RU); Alexander Roger Deas, Edinburgh (GB)

(73) Assignee: Acuid Corporation Limited, Guernsey (GB)

( * ) Notice: Subject to any disclaimer, the term of this patent is extended or adjusted under 35 U.S.C. 154(b) by 0 days.

(21) Appl. No.: 09/423,804
(22) PCT Filed: Nov. 12, 1998
(86) PCT No.: PCT/RU98/00377
  § 371 Date: Nov. 12, 1999
  § 102(e) Date: Nov. 12, 1999
(87) PCT Pub. No.: WO00/29958
  PCT Pub. Date: May 25, 2000

(51) Int. Cl.⁷ .............................................. G06F 12/02
(52) U.S. Cl. ........................ 711/202; 211/200; 211/201; 211/203; 211/206; 211/209
(58) Field of Search ........................... 711/202–207, 209

(56) References Cited

U.S. PATENT DOCUMENTS

| | | | | |
|---|---|---|---|---|
| 5,287,452 A | * | 2/1994 | Newman ..................... | 345/520 |
| 5,301,288 A | * | 4/1994 | Newman et al. ............. | 711/202 |
| 5,396,619 A | * | 3/1995 | Walton ........................... | 714/8 |
| 5,559,980 A | * | 9/1996 | Connors et al. ............. | 711/171 |
| 5,561,784 A | * | 10/1996 | Chen et al. ..................... | 714/8 |
| 5,720,031 A | * | 2/1998 | Lindsay ........................ | 714/42 |
| 5,794,016 A | * | 8/1998 | Kelleher ..................... | 345/505 |
| 6,104,417 A | * | 8/2000 | Nielsen et al. .............. | 345/521 |
| 6,205,531 B1 | * | 3/2001 | Hussain ...................... | 711/207 |
| 6,247,084 B1 | * | 6/2001 | Apostol, Jr. et al. ........ | 710/108 |

FOREIGN PATENT DOCUMENTS

| | | |
|---|---|---|
| EP | 0 824 237 A2 | 2/1998 |
| JP | 03 010 380 | 1/1991 |

OTHER PUBLICATIONS

Newman G. "Memory Management Support for Tiled Array Organization", Computer Architecture News, vol. 20, No. 4, Sep. 1, 1992, pp. 22–30, XP0002985813.*
International Search Report, Feb. 23, 2001.

* cited by examiner

Primary Examiner—Than Nguyen
(74) Attorney, Agent, or Firm—Nath & Associates PLLC; Gary M. Nath; Marvin C. Berkowitz

(57) ABSTRACT

A system for transformation of memory device addresses between different memory device topologies, each topology having its address space, providing the use of minimum memory space and time required for storage and computing defect data and also the flexibility of approach which allows mapping of memory device divided into an arbitrary number of tiles, each tile having different mapping scheme from a wide spectrum of mapping classes.

22 Claims, 6 Drawing Sheets

| | Tile0 | tile1 | tile2 | tile3 | tile4 | tile5 | tile6 | tile7 | tile8 |
|---|---|---|---|---|---|---|---|---|---|
| | DQs: 0, 1, 2, 3 | DQs: 4, 5, 6, 7 | DQs: 8, 9, 10, 11 | DQs: 12, 13, 14, 15 | DQs: 16, 17, 18, 19 | DQs: 20, 21, 22, 23 | DQs: 24, 25, 26, 27 | DQs: 28, 29, 30, 31 | DQs: 32, 33, 34, 35 |

Fig.4a

DQ location table

| Glob | Tile | Loc |
|---|---|---|
| 0 | 0 | 0 |
| 1 | 0 | 1 |
| 2 | 0 | 2 |
| 3 | 0 | 3 |
| 4 | 1 | 0 |
| 5 | 1 | 1 |
| 6 | 1 | 2 |
| 7 | 1 | 3 |
| ... | ... | ... |
| 35 | 8 | 3 |

Fig.4b

Example of transformation:

Global Logical Address:
DQ : 6;
Row : 0201(Hex);
Col : 001F(Hex).

⇒ Local Logical Address:
DQ : 2;
Row : 0201(Hex);
Col : 001F(Hex).

⇒ Local Physical Address:
Row : 1DFE(Hex);
Col : 007E(Hex).

⇒ Global Physical Address:
Row : 1DFE(Hex);
Col : 087E(Hex).

Fig.4c

SYSTEM AND A METHOD FOR TRANSFORMATION OF MEMORY DEVICE ADDRESSES

TECHNICAL FIELD

The present invention relates to a memory unit address transformation system and a method of transformation and may be used, for example, for address transformation from a logical address space into a topological address space in solid state memory devices, including semiconductor, ferroelectric, optical, holographic, molecular and crystalline atomic memories.

The present invention is applicable in particular, though not exclusively, in test systems for engineering test analysis, for example, for processing and representation of defect data, or in memory redundancy allocation systems for establishing a relationship between memory unit addresses in different memory device topologies for the purposes of distribution of spare resources.

BACKGROUND OF THE INVENTION

In the memory industry, large electronic systems are produced having hundreds of integrated circuits called devices designed to implement a large number of logical functions. These functions are implemented by the logical design of the system. However, the actual physical structure of the system which specifies the actual physical locations of the electronic components necessary to implement the logical, i.e. electrical, functions, differs from the logical design.

To test memory products after fabrication, different test methods are used, some of them being independent of the physical location of the memory cell, but most requiring knowledge of the placement of every cell. The address presented to the memory device is called the logical, or electrical, address; this may not be the same as the address used to access the physical memory cell or cells, which is called the topological, or physical address (see A. J. van de Goor "Testing Semiconductor Memories: Theory and Practice", publ. by John Wiley & Sons, 1996, pp.429–436). The translation of logical addresses into topological addresses is called address transformation, or mapping. When addresses are transformed, successive logical addresses may transform into non-successive topological addresses.

The size and density of memory products has increased exponentially over time: from $2^{10}$ bits in 1971 to more than $2^{28}$ bits being sampled by manufacturers today. As the density of memory devices increases, the number of defects in them increases as well. To properly test a memory device, a detailed description of the internal topology and address mapping of the device is required in order to run complex redundancy schemes and optimize testing procedures.

Many known apparatuses for testing semiconductor devices employ an error catch memory that receives from an address generator circuit addresses of locations on a device at which errors occur, such as the row and column logical addresses of memory locations in a memory cell. To retrieve the error data and the logical addresses and display the errors or enable the repair means, a special means for mapping addresses from logical into physical address space is required.

To establish such a correspondence between physical and logical addresses of memory cells within a memory device, various mapping systems are used, e.g. described in U.S. Pat. No. 5,561,784 or U.S. Pat. No. 5,396,619. The result is stored typically as an address transformation table with 2n entries that requires a lot of routine machine work to create and too much space for storage. Besides, reverse transformation requires the same memory space as direct transformation and is not possible where the available memory is restricted.

Complex software procedures employed typically in testing equipment are inherently slow, particularly where many mapping algorithms must be performed for many addresses in a complex semiconductor device. It shall be noted also that a conventional transformation means does not permit a large number of DQ's (where DQ is a bidirectional data pins) to be encompassed within one memory device. At the same time, the present tendency to increase the number of DQ's creates the necessity of developing new procedures capable of handling such topologies.

An apparatus and a method of testing a semiconductor device proposed in U.S. Pat. No. 5,720,031 permits mapping from logical into topological address space and the display of the locations of errors on the display device. However, to perform two-step mapping, first from logical into physical addresses and then from physical into spatial locations for displaying errors on a bitmap display device, the known system employs complex means including router and topological circuits programmable by a host minicomputer or personal computer. Moreover, the known system is cost-ineffective and provides affine mapping only and only where the address space is divided into $2^n$ tiles.

Also known is an address transformation means that may be implemented both in hardware and software and provides a fast, simple and cost-effective procedure for direct and reverse transformation of memory addresses regardless of mapping direction and type of address space (see UK 9725066.6). However, it is also applicable for affine transformations only and only where the address space is divided into 2n tiles.

At the same time, a new generation of complex memory devices produced today employs an arbitrary number of DQ planes [(where DO bidirectional data pins)] physically corresponding to the external pins of a single semiconductor device, e.g. 9, 18, 36, 72, 144 and even 288 DQs, which cannot be represented by $2^n$. Moreover, each array in the semiconductor device could itself have a logical addressing scheme and mapping that differs from those of the neighboring arrays on the device.

Thus, the main drawback of the known systems is that they permit transformation only when the number of tiles is a power of two (i.e. $2^n$) and cannot be used for complex mapping in the case of non-affine device topologies and if a memory device is divided into an arbitrary number of tiles.

Therefore, a problem exists of creating a suitable means enabling address transformation for memory devices having an arbitrary number of tiles, wherein each tile may have its own mapping scheme.

SUMMARY OF INVENTION

It is an object of the present invention to provide an address transformation system capable of a complex, for example, non-affine, configurable mapping of a memory device having an arbitrary number of tiles, and a user friendly method of transformation, thus enabling simplification in some applications of the representation of the transformation.

According to one aspect of the present invention, a system for transformation of memory device addresses between different address spaces of a memory device partitioned into an arbitrary number of tiles is provided, the system comprising a combination of transformation means for transforming addresses from one address space into another address space, the combination being such that to each said tile a corresponding transformation means of said combination is assigned, a means for storing and retrieving information about memory device architecture, and a means for enabling the operation of the said combination which analysed incoming addresses and decides, using said means for storing and retrieving information, which transformation means of said combination shall be enabled.

Typically, to perform transformation from one address space into another, the enabling means comprises an address input means for receiving memory cell addresses from one address space, an address transformer means (herein called also address transformers) for transforming local into global addresses or global into local addresses, and an address output means to output addresses in the other address space. To perform transformations from one address space into another and the reverse transformation, the enabling means should comprise two address input means, i.e. one input means for the first address space and one input means for the second, two address transformers and, respectively, two address output means. Other modifications are possible within the scope of the present invention.

Any suitable means for storing and retrieving information about memory device architecture may be used provided it stores locations of DQ planes in a memory. Each tile in a physical topology, having a size of $2^n \times 2^m$, may have up to $2^k$ DQ's assigned to it from the logical (electrical) topology). Thus, the following information shall be stored to perform the transformation: the total number of DQ's calculated as $NDQ=2^k \times N_{tiles}$; the address of a tile assigned to each DQ; a number given to the DQ within the tile. It may be easily determined then which number is given to each DO in a particular tile and within which tile this DQ lies.

Preferably, the locations of each DQ plane are stored in the form of a one-to-one correspondence table between global DQ numbers and pairs of tile numbers and local DQ numbers. To increase the speed of processing, the system may comprise a plurality of DQ local to global recoding tables, each table corresponding to a particular transformation means, so that each transformation means from the combination is provided with the recoding table.

Generally, any suitable combination of transformations may be uses, for example, transformations may be arranged in an array or a dictionary, or some other order, wherein each transformation may be accessed easily and independently. This permits to represent non-affine mapping for the memory device whatever memory architecture have been actually applied.

Any suitable transformation means (herein referred to as "a simple transformation means") may be employed for representation of mapping for each tile. As a rule, transformation formulas supplied by the manufacturer are [ta]ken to define the transformation.

Preferably, an affine transformation means, for example, the affine transformation means described in UK 9725066.6 which provides fast and simple affine mapping, may be used. The known affine transformation means are capable of a configurable mapping represented as affine transformation in $P^n$ space, where n denotes the total number of bits in an address, and P is the modulo 2 field. For the purposes of clarity within the description of the present invention the total number of bits in an address is represented as (n+m), where n is the total number of bits in a row address, and m is the total number of bits in a column address. Thus, each affine transformation Mean5 are capable of a configurable mapping which may be correspondingly represented as an affine transformation in $p^{n+m}$ space, where n and m denote the total number of bits in the row and column addresses, respectively, while the transformation map may be stored as an (n+m)×(n+m) matrix of bits and an (n+m)×1 translation vector, $2^n \times 2^m$ being the tile size in bits.

According to the invention, the proposed combination of affine transformations is capable of representing non-affine mapping. An important feature of the invention is also that the transformation system may perform the reverse address transformation.

According to another aspect of the present invention, a method of transformation of memory device addresses between different address spaces of a memory device partitioned into an arbitrary number of tiles-comprises the steps of inputting memory cell addresses from one address space, storing and retrieving information about DQ locations in a memory device, combining a plurality of transformation means for transforming addresses from one address space into another →dress space so as to obtain such a combination that to each said tile from the said arbitrary number of tiles a corresponding transformation means of said combination may be assigned, enabling the operation of the said combination by analysing incoming addresses and, using information about DQ locations, selecting a corresponding transformation means of said combination to perform transformation for a particular tile to obtain output local coordinates of address in the other address space, transforming the obtained local coordinates into global coordinates, and outputting global coordinates for addresses in the other address space.

The proposed transformation method may also be computer-implemented permitting fast, flexible and extremely easy address transformation without the necessity of performing vast routine machine calculations.

According to the invention, a system and a method of transformation may be used in the case of different address transformations, for example, from logical into topological address space for engineering purposes, from logical into an address space appropriate for purposes of redundancy allocation and laser repair procedures, and others.

The term "a memory cell" is used herein as an example of a memory addressable unit and shall not be interpreted as a limiting feature. In general, any addressable memory device falls within the scope of the present invention and may be treated in accordance with the proposed procedures, including a memory tile, memory cell, memory chip or any other memory addressable device. The proposed system may also comprise means for collecting and storing information about transformations in the form of a transformation map.

For a better understanding of the present invention and to show how the same may be carried into effect, reference will now be made, by way of example, without loss of generality, to the accompanying drawings in which:

FIG. 4 illustrates an example procedure of affine transformation from logical into physical address space.

Figure 1:
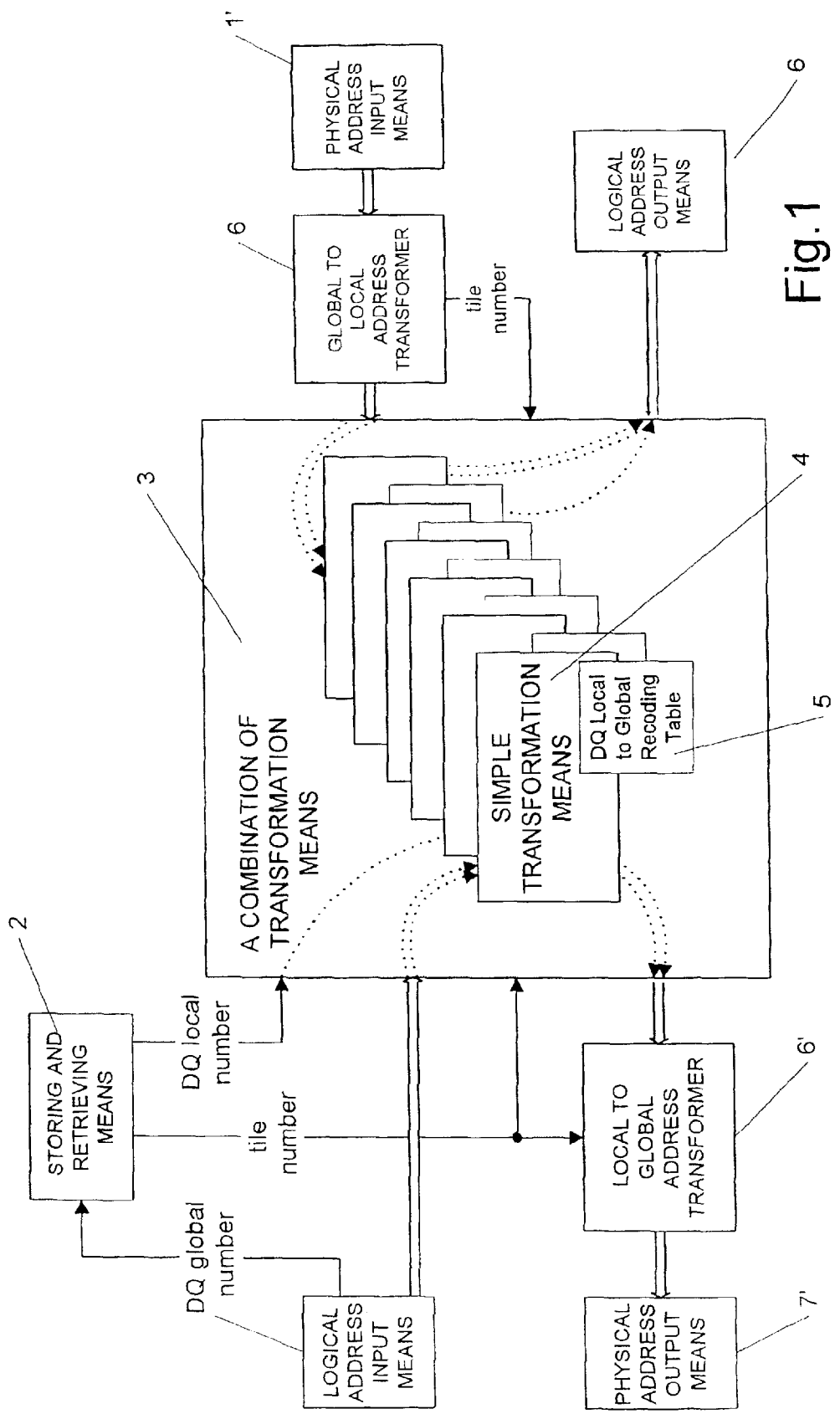
FIG. 1 is a general scheme illustrating a system for address transformation according to the present invention.

Referring to FIG. 1, a system for transformation of memory cell addresses according to the present invention comprises a logical address input means 1 adapted to receive logical addresses and physical address input means 1' adapted to receive physical addresses. The system further comprises a storing and retrieving means 2 for storing information about memory device architecture, in particular, locations of DQ planes in a memory. A combination 3 of transformation means 4 may consist of a suitable plurality, e.g. of an array or a dictionary of transformations, wherein all the transformations may be the same or different, the combination being arranged in such a way so as each tile from the arbitrary number of tiles of a memory device can be provided with a corresponding affine transformation means of the combination, each means being accessible using a tile number. For some applications, to each simple transformation means 4 a local to global DO number recoding table 5 may be assigned. A local to global address transformer 6 is adapted for transformation of local addresses into global addresses; a global to local address transformer 6' is adapted to provide local addresses. Address output means 7 and 7' output the obtained global physical or logical addresses.

Figure 2:
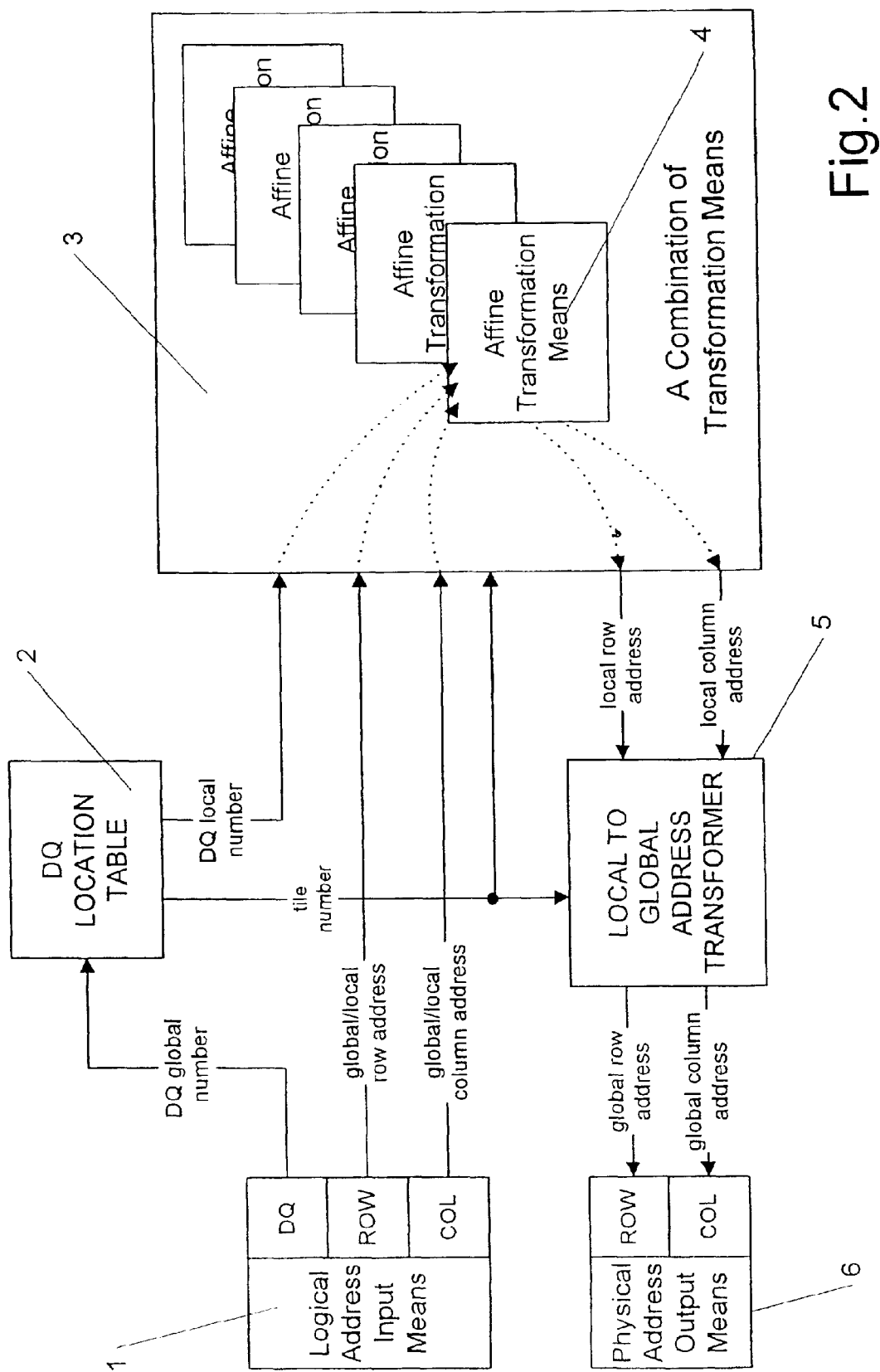
FIG. 2 is a block scheme illustrating the first example embodiment of the invention showing a system for address transformation from logical into physical address space.
Figure 3:
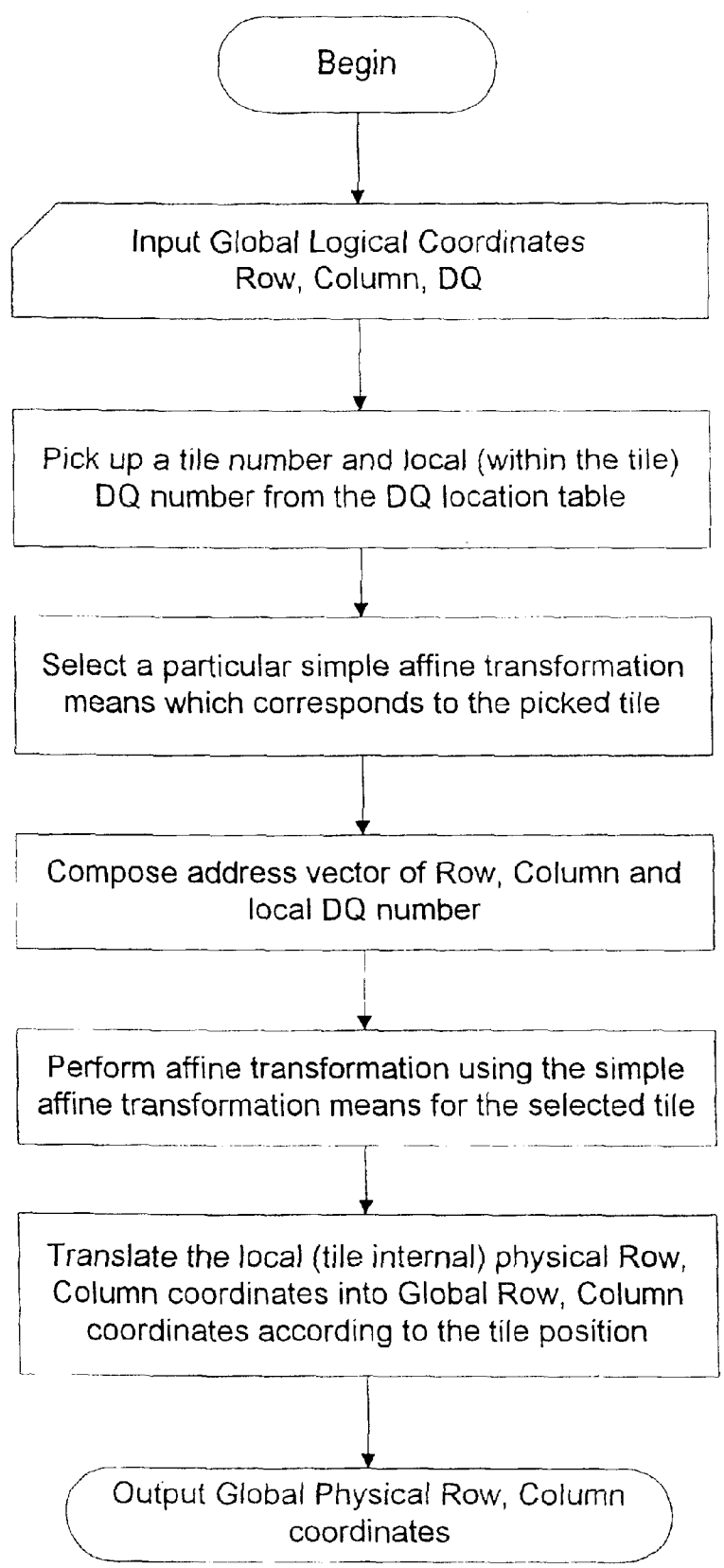
FIG. 3 shows an example flow chart of the operation of the transformation system of FIG. 2.

The first example embodiment of the system and method according to the present invention is shown in FIGS. 2–4 for transformation from Logical into Physical address space.

Logical→Physical address transformation

As shown in FIG. 2, a system for transformation of memory cell addresses is configured to perform address transformation from logical into physical address space. The system comprises an address input means 1 adapted to receive logical addresses of a memory device in the form of address vectors composed of bits of Row, Column and DQ addresses. The system further comprises a DQ location table 2 storing a one-to-one correspondence between global DQ numbers, tile numbers and local DQ numbers within the tile. The DQ location table may be implemented in the form of the array: (global DQ number):(local DQ number, tile number).

A combination 3 of transformation means 4 is implemented according to the present example in an array of affine transformations. A transformer means 5 are adapted for transformation of local physical addresses into global addresses, and an address output means 6 outputs the obtained global physical addresses which may be used in software or hardware tools for—storing or monitoring or viewing defect positions, e.g. during testing procedures.

The system in FIG. 2 operates as follows. Row and column addresses from the address input means I are inputted directly into an array 3 of affine transformations. In general, a memory device may be physically partitioned into an arbitrary number of tiles depending on the memory device architecture, or the actual number of DQ's which should correspond to the number of external pins. Thus, the array 3 comprises such a number of transformation means that to each tile at least one transformation means from the said array may be assigned.

A global DQ number from the address input means is stored in a DQ location table 2, wherefrom a corresponding local DQ number within the selected tile is retrieved to the array 3 of affine transformations. On the basis of the information stored in the DQ location table 2, a particular simple affine transformation means 4 which corresponds to the selected tile is enabled.

Any suitable affine transformation means may be used as the means 4 to carry out the transformation for each tile. Preferably, affine transformation means described in details in UK application 9725066,6 may be used. In this case, an array of affine transformation means comprises a plurality of mapping matrices M and translation vectors T. The said matrices and translation vectors may be easily obtained by a specialist in the art from the formula supplied by the manufacturer.

The obtained addresses are local addresses within the selected tile, which are transformed into global addresses by the address transformer 5. The resulting addresses are outputted to the address output means 6.

An example flow chart of the method is shown in FIG. 3.

To initiate the transformation, logical coordinates in bit form including logical Row address, logical Column address, and DQ address are inputted into the system, whereupon a DQ location table is created. Then, a tile number and local DQ number within the tile are picked up from the DQ location table to select a particular affine transformation means from the array. An address vector of row, column and local DQ number is composed and the affine transformation means is enabled for the selected tile. Transformation may be performed using mapping matrices and translation vectors.

An example procedure for performing the transformation for the address space divided into an arbitrary number of tiles is illustrated further in details in FIG. 4.

According to the example, an address space comprises 9 tiles and thus cannot be represented as $2^n \times 2^m$ address space. Each tile has size of $2^{14}$ rows$\times 2^{11}$ columns and contains 4 DQ lanes, the total number of DQs being 36 (see FIG. 4$a$). For the above memory architecture the following DQ location able for this layout is shown in FIG. 4$b$.

Let the incoming address be as follows: DQ number=6; Row address=0101(Hex); Column address=001F(Hex).

To perform the transformation, first the tile number and local DQ number are taken from the DQ location table of FIG. 4$b$. For the present example, tile number is 1 and local DQ number is 2. The local logical row and column addresses remain unchanged under the global to local transformation. Then, according to the tile number, the simple affine transformation means corresponding to the tile is selected.

Suppose, the transformation formulas are as follows:

| | |
|---|---|
| PR0=!LR0^LR12 | PR13=LR12 |
| PR1=!LR1^LR12 | PC0=DQ0 |
| PR2=!LR2^LR12 | PC1=DQ1 |
| PR3=!LR3^LR12 | PC2=LC0^DQ2^DQ3 |
| PR4=!LR4^LR12 | PC3=LC1^DQ2^DQ3 |
| PR5=!LR5^LR12 | PC4=LC2^DQ2^DQ3 |

-continued

| | |
|---|---|
| PR6=!LR6^LR12 | PC5=LC3^DQ2^DQ3 |
| PR7=!LR7^LR12 | PC6=LC4^DQ2^DQ3 |
| PR8=!LR8^LR12 | PC7=LC5^DQ2^DQ3 |
| PR9=!LR9^LR12 | PC8=LC6^DQ2^DQ3 |
| PR10=!LR10^LR12 | PC9=LC7^DQ2^DQ3 |
| PR11=!LR11^LR12 | PC10=!DQ2^DQ3 |
| PR12=!LR12^DQ3 | |
| where | |

PR n is n-th bit in physical row address, where n=0,1. 13, i.e. the number of bits in row address is 14;

PC n is n-th bit in physical column address, where n 0,1 ... 10, i.e. the total number of bits in column address is 11;

LR n is n-th bit in logical row address, where n=0, 1 ... 12, i.e. the total number of bits in row address is 13;

LC n is n-th bit in logical column address, where n=0, 1 ... 7, i.e. the total number of bits in column address is 8;

DQ n is n-th bit in logical address representing the number of the plane in logical address, where n=0, 1 .3, i.e. the total number of bits in DQ address is 4.

On the basis of these formula the following matrix of size 25×25 bits and translation vector are obtained:

Translation Vector t: 1000000000001111111111111
Transformation Matrix M:

```
0000000000001000000000001
0000000000001000000000010
0000000000001000000000100
0000000000001000000001000
0000000000001000000010000
0000000000001000000100000
0000000000001000001000000
0000000000001000010000000
0000000000001000100000000
0000000000001001000000000
0000000000001010000000000
0000000000001100000000000
1000000000001000000000000
0000000000001000000000000
0001000000000000000000000
0010000000000000000000000
1100000000010000000000000
1100000000100000000000000
1100000001000000000000000
1100000010000000000000000
1100000100000000000000000
1100001000000000000000000
1100010000000000000000000
1100100000000000000000000
1100000000000000000000000
```

The local logical address vector V composed of bits of row, column and DQ address may be represented as follows:

| (0010 | 00011111 | 00000100000001) |
|---|---|---|
| DQ | Column | Row |

To perform mapping for this tile, the above vector V composed of bits of Row, Column and DQ addresses for this tile is multiplied by matrix M and then a translation vector T is added to the result as shown in FIG. 4c.

The next step is performing local to global physical address transformation by parallel translation with respect to the tile position. According to the present example, a zero shall be added to row coordinate and $2^{11}$ to column coordinate. The resulting physical global address vector is: Row=1DEF; Col=087E.

Another example embodiment showing a transformation system and method for performing the transformation from physical into logical address space will now be explained in detail and illustrated in FIGS. 5–6.

Physical→Logical address transformation

Figure 5:
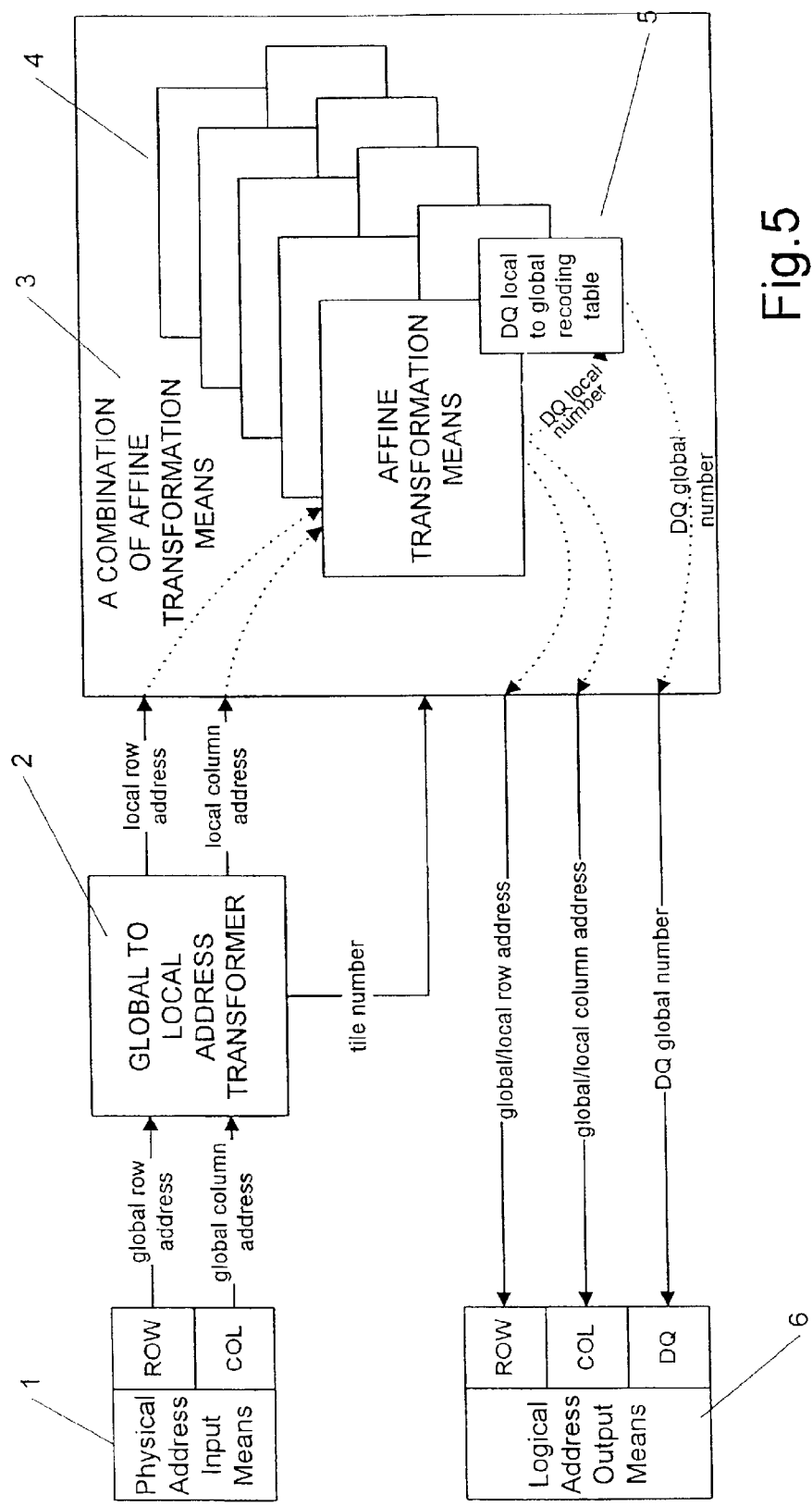
FIG. 5 is a block scheme showing the second example embodiment of the invention comprising a system for address transformation from physical into logical address space.

As shown in FIG. 5, a system for transformation of memory cell addresses is configured to perform address transformation from physical into logical address space. The system comprises an address input means 1 adapted to receive physical addresses of a memory device in the form of physical address vectors composed of bits of Row and Column addresses. The system further comprises an address transformer 2 for transforming incoming (global) addresses into tile internal (local) addresses. The tile number is generated and the local address is inputted into a combination 3 of affine transformation means 4. The combination 3 of simple affine transformation means 4 is implemented according to the present example in an array comprising a plurality of affine transformations. The combination 3 further comprises a plurality of DQ location recoding tables 5 providing for each local DQ number a corresponding global DQ number. The DQ location recoding table may be implemented in the form of an array. An address output means 6 is adapted to output the obtained global logical addresses.

The transformation system in FIG. 5 operates as follows. Row address and column address from the address input means 1 are inputted into the address transformer 2 wherefrom row part and column part of the address bit vector V is transferred to the combination 3 of at fine transformations. A tile number is used to select a corresponding affine transformation means 4 from the array 3. Each affine transformation means is provided with a DQ location recoding table indicating for each local DQ number a corresponding global DQ number. The obtained row and column global logical addresses and DQ global numbers are outputted to the address output means 6.

Figure 6:
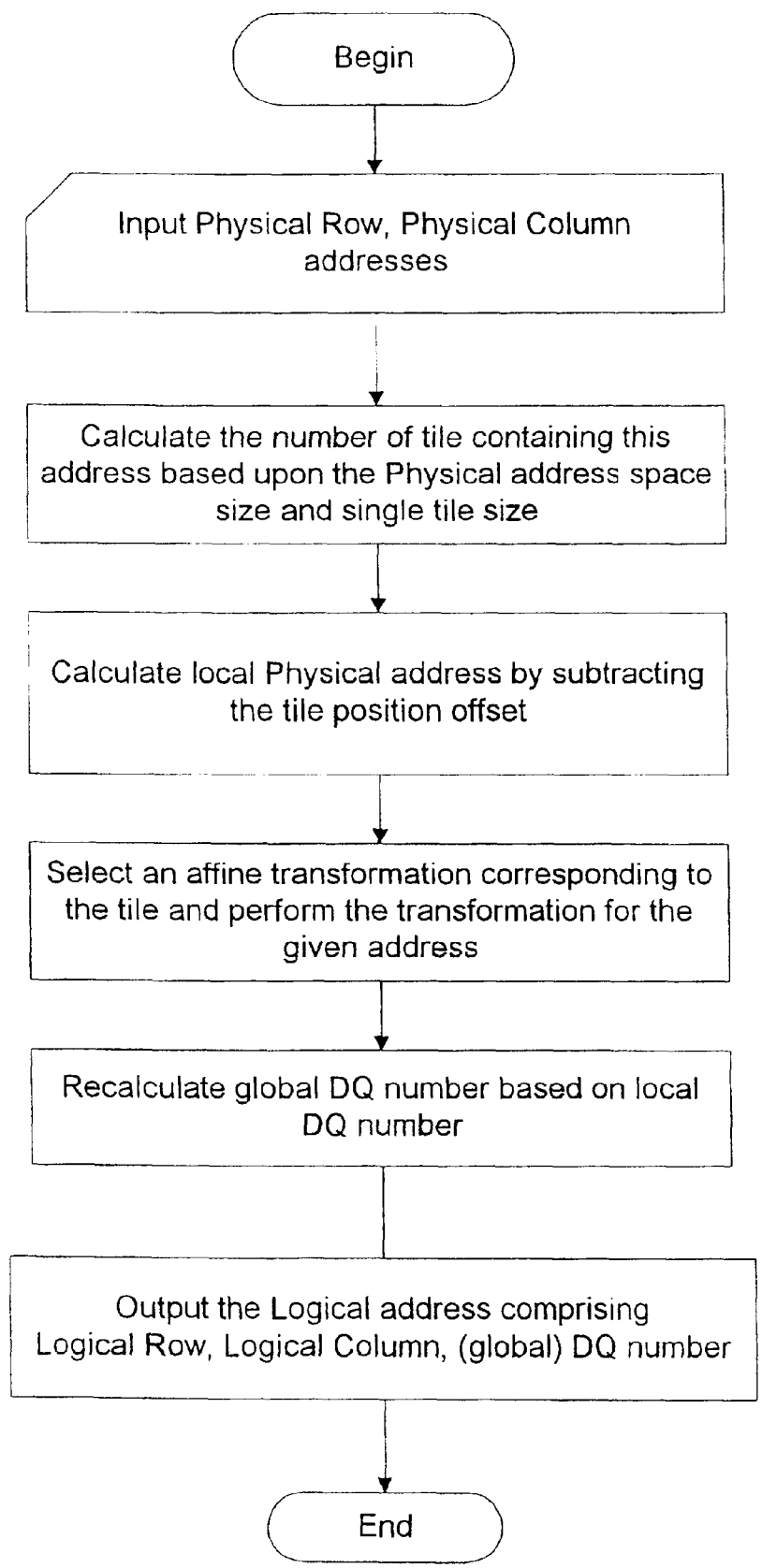
FIG. 6 shows an example flow chart of the operation of the transformation system of FIG. 5.

An example flow chart of the method is shown in FIG. 6.

First, physical row and column addresses are inputted into the system. Global coordinates are transformed into local coordinates by subtracting the tile position offset. The number of tile containing this address is calculated to choose a corresponding affine transformation. The affine transformation is performed then for the selected tile. The corresponding global DQ number is calculated using a local to global DQ number recoding table and the global logical coordinates are outputted from the logical output means.

To define transformations of memory cell addresses when transformation formulas are unknown, a means for defining transforms of the memory device addresses is completely described in PCT/RU98/00275 filed 19.08.98, corresponding to the applicants' co-pending U.S. patent application 09/377,172, incorporated herein by reference, can be used. The said means comprises a sample pairs generator for generating pairs of addresses, each pair consisting of one memory cell address in the first address space and one address in the second address space, a receiving means for receiving a representative plurality of said pairs of addresses, a storage means for storing said pairs of addresses and a means for computing transformation formulas.

A computer program for implementing functions of the above system and/or performing the above method of memory address transformation may be created in any suitable computer language, e.g. C, C++, any Assembler, etc. in a manner evident for a person skilled in the art.

Thus, the proposed transformation system comprises a combination of transformation means which is capable of processing a memory device divided into an arbitrary number of tiles, wherein each separate tile can be characterised by an affine mapping scheme, while the device as a whole may have a non-affine mapping scheme.

It will be appreciated that the above are example embodiments only and that various modifications may be made to the embodiments described above within the scope of the present invention.

What is claimed is:

1. A system for transformation of memory device addresses between different address spaces of a memory device partitioned into an arbitrary number of tiles, the memory device having at least one bidirectional data pin DQ plane, the system comprising:

a combination of transformation means for transforming addresses from one address space into another address space, the combination being such that to each said tile a corresponding transformation means of said combination is assigned, a means for storing and retrieving information about locations of each of said at least one bidirectional data pin DQ plane in the memory, and a means for enabling operation of said combination which analyses incoming addresses and decides using said means for storing information which transformation means of said combination shall be enabled.

2. A system according to claim 1, wherein the enabling means comprises:

at least one address input means for receiving memory cell addresses from one address space, at least one address transformer means for transforming local into global addresses or global into local addresses, and at least one address output means for outputting addresses in another address space.

3. A system according to claim 2, wherein, to perform transformation from logical into physical address space, the address input means is adapted to receive addresses from logical address space, the means for storing and retrieving information about locations of each said at least one bidirectional data pin DQ plane stores locations of each DQ plane in the form of a one-to-one correspondence table between global DQ plane numbers and pairs of tile numbers and local DQ plane numbers, the address transformer means is adapted to transform physical local row and column coordinates into physical global row and column coordinates, and the address output means is adapted to output addresses in physical address space.

4. A system according to claim 2, wherein, to perform transformation from physical into logical address space, the address input means is adapted to receive addresses from physical address space, the means for storing and retrieving information about locations of each said at least one bidirectional data pin DQ plane stores locations of each DQ plane in the form of a plurality of local to global DQ number recoding tables, the address transformer means comprises an address analyser which analyses physical global row and column addresses and outputs physical local row and column addresses, and the address output means is adapted to output addresses in logical address space.

5. A system according to claim 1, wherein the locations of each DQ plane are stored in the form of a one-to-one correspondence table between global DQ plane numbers and pairs of tile numbers and local DO plane numbers.

6. A system according to claim 1, wherein the locations of each DQ plane are stored in the form of a plurality of DQ local to global recoding tables, so that each transformation means from the combination is provided with a corresponding recoding table.

7. A system according to claim 1, wherein said combination comprises an array of transformation means.

8. A system according to claim 1, wherein the combination of transformation means is adapted to provide a non-affine mapping.

9. A system according to claim 1 wherein the transformation -means comprises affine transformation means.

10. A system according to claim 9, wherein the affine transformation means is capable of a configurable mapping represented as an affine transformation in $p^{n+m}$ space, where n and m denotes a total number of bits in row and column addresses, correspondingly, and P is a modulo 2 field.

11. A system according to claim 9, wherein the affine transformation means stores a transformation map as an $(n+m) \times (n+m)$ matrix of bits and an $(n+m) \times 1$ translation vector, where n and m are a total number of bits in row and column addresses, correspondingly, $2^n \times 2^m$ being a tile size in bits.

12. A system according to claim 1, wherein the system further comprises a means for defining memory cell address transformations when transformation formulas are not available, comprising:

a receiving means for receiving a representative plurality of pairs of addresses, each pair consisting of one memory cell address in a first address space and one address in a second address space, wherein each address is a vector of n bits of row, column, and DQ addresses;

an address pairs storing means for storing said pairs of addresses in a matrix form, and a computing means for computing transformation formulas.

13. A system according to claim 1, wherein the system is adapted to perform both direct and reverse transformation.

14. A system according to claim 13, wherein, to perform transformation from a physical into a logical address space and the reverse transformation, the system comprises:

a first address input means adapted to receive addresses from the logical address space, a second address input means adapted to receive addresses from the physical address space, the means for storing and retrieving locations of each DQ plane are in the form of a one-to-one correspondence table between global DQ plane numbers and pairs of tile numbers and local DQ plane numbers, a plurality of local to global DQ number recoding tables, such that each transformation means from the combination is provided with a corresponding recoding table, a first address transformer means adapted to transform physical local row and column coordinates into physical global row and column coordinates, a second address transformer means adapted to transform physical global row and column coordinates into physical local row and column coordinates, a first address output means adapted to output addresses in the logical address space, and a second output means adapted to output addresses in the physical address space.

15. A system according to claim 1, wherein said combination comprises a dictionary of transformation means.

16. A method of transformation of memory device addresses between different multidimensional address spaces of a memory device partitioned into an arbitrary number of tiles, the method comprising:

provyding a plurality of transformation means for transforming addresses from one address space into another address space, and assigning to each said tile a corresponding transformation means of said plurality, storing and retrieving information about bi-directional data pins DQ plane locations in the memory device, analysing incoming addresses and, using said information about bidirectional data pins DQ plane locations, enabling operation of a particular transformation means assigned to a selected tile, to perform transformation for this tile to obtain local coordinates of the addresses in the other address space.

17. A method according to claim 16, wherein transformations means are combined so as to obtain an array of transformations.

18. A method according to claim 16, wherein the method further includes a step of identifying transformation formulas for transforming memory device addresses by receiving a representative plurality of pairs of addresses, each pair consisting of one memory cell address in the first address space, and one address in the second address space, wherein each address is a vector of n bits of row, column, and DQ addresses;

storing said pairs in a matrix form; and computing transformation formulas.

19. A method according to claim 16, further comprising transforming the obtained local coordinates into global coordinates, and outputting global coordinates in the other address space.

20. A method according to claim 16, wherein said combination comprises a dictionary of transformation means.

21. A computer program product comprising:

a computer usable medium having computer readable program code means embodied in said medium for enabling the transformation of memory device addresses between different multidimensional address spaces of a memory device partitioned into an arbitrary number of tiles, said computer readable program code means comprising:

a computer readable program code means for causing a computer to combine transformation means for transforming addresses from one address space into another address space so as to obtain a combination wherein to each said tile a corresponding transformation means of said combination is assigned;

a computer readable program code means for causing the computer to store and retrieve information about bidirectional data pins DQ plane locations in the memory device;

a computer readable program code means for causing the computer to analyse incoming addresses and, using the said information about bidirectional data pins DQ plane locations, enable the operation of a particular transformation means of said combination to perform transformation for the selected tile to obtain local coordinates of the addresses in the other address space.

22. A computer program product according to claim further comprising a computer readable program code means for causing the computer to transform the obtained local coordinates into global coordinates, and output the global coordinates in the other address space.

* * * * *

UNITED STATES PATENT AND TRADEMARK OFFICE
CERTIFICATE OF CORRECTION

PATENT NO. : 6,393,543 B1
DATED : May 21, 2002
INVENTOR(S) : Vilkov et al.

It is certified that error appears in the above-identified patent and that said Letters Patent is hereby corrected as shown below:

Column 10,
Line 14, change "-means" to -- means -- (i.e. remove hyphen).

Column 12,
Line 31, after "claim", insert -- 21, --.

Signed and Sealed this

Seventeenth Day of September, 2002

Attest:

Attesting Officer

JAMES E. ROGAN
Director of the United States Patent and Trademark Office